(12) United States Patent
Qiu et al.

(10) Patent No.: US 9,845,421 B1
(45) Date of Patent: Dec. 19, 2017

(54) ENCAPSULATING AGENT AND PREPARING METHOD THEREOF, AND DRILLING FLUID FOR PETROLEUM DRILLING

(71) Applicant: CHINA UNIVERSITY OF PETROLEUM (East China), Qingdao (CN)

(72) Inventors: Zhengsong Qiu, Qingdao (CN); Xin Zhao, Qingdao (CN); Hanyi Zhong, Qingdao (CN); Wei'an Huang, Qingdao (CN); Yongjun Zhang, Qingdao (CN); Guowe Zhou, Qingdao (CN)

(73) Assignee: China University of Petroleum (East China), Shandong (CN)

( * ) Notice: Subject to any disclaimer, the term of this patent is extended or adjusted under 35 U.S.C. 154(b) by 0 days.

(21) Appl. No.: 15/368,037

(22) Filed: Dec. 2, 2016

(30) Foreign Application Priority Data

Nov. 7, 2016 (CN) .......................... 2016 1 0975131

(51) Int. Cl.
*C09K 8/12* (2006.01)
*C09K 8/36* (2006.01)
*C09K 8/22* (2006.01)
*C09K 8/88* (2006.01)

(52) U.S. Cl.
CPC .................. *C09K 8/12* (2013.01); *C09K 8/22* (2013.01); *C09K 8/882* (2013.01)

(58) Field of Classification Search
CPC ............. C09K 8/12; C09K 8/22; C09K 8/487
USPC .................................. 507/111, 119, 120, 121
See application file for complete search history.

(56) References Cited

U.S. PATENT DOCUMENTS

| | | | | | |
|---|---|---|---|---|---|
| 4,293,427 | A | * | 10/1981 | Lucas | E21B 21/003 507/121 |
| 4,484,631 | A | * | 11/1984 | Sherwood | C02F 5/12 166/294 |
| 5,275,809 | A | * | 1/1994 | Chen | A61K 8/8158 424/70.16 |
| 2004/0019133 | A1 | * | 1/2004 | Saito | A61K 8/0283 523/122 |
| 2009/0324964 | A1 | * | 12/2009 | Jaynes | C08F 220/56 428/426 |
| 2013/0005616 | A1 | * | 1/2013 | Gaillard | C08F 220/56 507/225 |
| 2014/0352960 | A1 | * | 12/2014 | Chung | C09K 8/588 166/278 |

* cited by examiner

*Primary Examiner* — Aiqun Li
(74) *Attorney, Agent, or Firm* — Calfee, Halter & Griswold LLP

(57) ABSTRACT

The present invention relates to the technical field of petroleum drilling, specifically provides an encapsulating agent and preparing method thereof, and a drilling fluid, wherein the encapsulating agent comprises an acrylamide monomer structure unit represented by formula (I), an anti-temperature monomer structure unit represented by formula (II) and an cation monomer structure unit represented by formula (III);

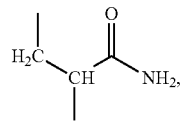

formula (I)

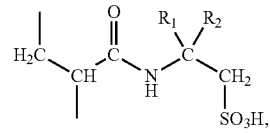

formula (II)

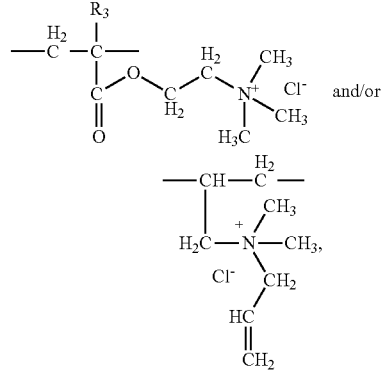

formula (III)

wherein $R_1$ and $R_2$ are each independently H, and linear or branched alkyl of C1-C15, and $R_3$ is H or the linear or branched alkyl of C1-C5. The drilling fluid provided in the present invention has strong inhibition property and stable rheological property.

18 Claims, No Drawings

ENCAPSULATING AGENT AND PREPARING METHOD THEREOF, AND DRILLING FLUID FOR PETROLEUM DRILLING

CROSS REFERENCE TO RELATED APPLICATIONS

This application claims priority to Chinese Application No. 201610975131.0, filed on Nov. 7, 2016, entitled "Encapsulating Agent, Preparing Method and Use thereof, and Drilling Fluid for Petroleum Drilling", which is specifically and entirely incorporated by reference.

FIELD OF THE INVENTION

The present invention relates to an encapsulating agent and a preparing method thereof, and a drilling fluid for petroleum drilling, more specifically, to a deep water water-based drilling fluid that has strong inhibition property and can maintain stable rheological property in a large temperature difference range of a deep water wellbore.

BACKGROUND OF THE INVENTION

The sea deep water well has rich oil and gas resources, as well as great potentials. As compared with the land or shallow sea drilling, the sea deep water drilling faces many special technical problems, requiring the deep water drilling fluid must have the following characteristics: (1) maintaining a stable rheological property in a "low temperature-high temperature" large temperature difference. As the water depth increases, the temperature of the sea water lowers, normally 4° C. The low temperature causes the viscosity and shearing force of the drilling fluid to greatly increase and even a distinguishing jelling effect would happen to the oil-based drilling fluid, rendering over-high equivalent circulation density, causing problems such as well leakage and difficulty in starting a pump. As the depth for drilling increases, the temperature rises gradually, and the viscosity and shearing force of the drilling fluid would lower to further cause problems such as difficulty in carrying shale. Therefore, the drilling fluid maintaining a stable rheological property in the "low temperature in the bottom of the sea-high temperature at a deep portion" large temperature difference range is crucial to the operating efficiency of the deep water drilling. (2) Effectively inhibition of borehole instability caused by hydration, expansion and dispersion of the water sensitivity shale at the deep water shallow stratum. The hydration easily happens to the water sensitivity shale when contacting water, causing borehole instability, which severely influences the smooth operation for deep water drilling. Therefore, an effective hydration inhibitor is required to be used to improve the borehole stability. (3) Effectively inhibiting a problem of congestion caused by natural gas hydrate.

The oil-based/synthesis-based drilling fluid has advantages of excellent inhibition property and high temperature stability, is a top choice for complex stratum drilling. However, the cost thereof is high and it is not friendly to the environment. The water-based drilling fluid has the advantages of low costs and friendly to the environment. However, in deep water drilling, it is hard for the conventional water-based drilling fluid to solve the problem of borehole instability of the deep-water water sensitivity shale; the rheological property is greatly influenced by the temperature, so that the pressure of the wellbore is hard to control; and the hydrate congestion risk exists, so that it is hard to meet the engineering technique requirements for deep water oil gas exploration.

Currently, for the strong inhibition water-based drilling fluid, lots of researches are developed at home and abroad. Moreover, the water-based drilling fluid that is suitable for deep water drilling and has strong inhibition property and stable rheological property at the same time needs to be studied deeply.

SUMMARY OF THE INVENTION

The purpose of the present invention is to provide a deep water water-based drilling fluid that has strong inhibition property and can maintain stable rheological property in a large temperature difference range. It has inhibition property similar to the oil-based drilling fluid, and an maintain stable rheological property under the condition of a "low-temperature-high-temperature" large temperature difference.

In order to achieve the aforementioned purpose, according a first aspect of the present invention, the present invention provides a encapsulating agent, comprising an acrylamide monomer structure unit represented by formula (I), an anti-temperature monomer structure unit represented by formula (II) and a cation monomer structure unit represented by formula (III);

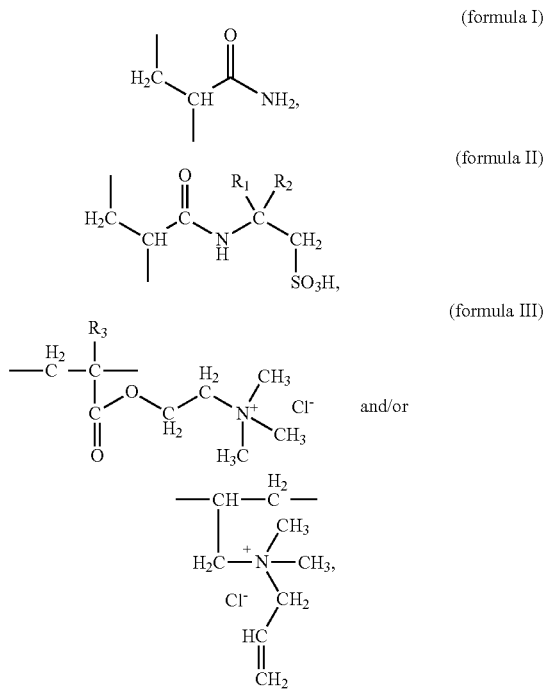

wherein $R_1$ and $R_2$ are each independently H, and linear or branched alkyl of C1-C15, and $R_3$ is H or the linear or branched alkyl of C1-C5.

According a second aspect of the present invention, the present invention provides a method for preparing the encapsulating agent of the present invention, wherein the method comprises: under a polymerization condition, performing a polymerization reaction on acrylamide, an anti-temperature monomer and a cation monomer.

According a third aspect of the present invention, the present invention provides a use of the encapsulating agent of the present invention in a drilling fluid for petroleum drilling.

According a fourth aspect of the present invention, the present invention provides a drilling fluid for petroleum drilling, wherein an encapsulating agent in the drilling fluid contains the encapsulating agent of the present invention.

The drilling fluid provided in the present invention has strong inhibition property and stable rheological property, and can be prepared using a conventional preparing method.

As compared with the prior art, the present invention has the following beneficial effects:

1. The drilling fluid of the present invention can effectively inhibit borehole instability caused by hydration of the deepwater water sensitivity shale, the inhibition property of which is equal to that of the oil-based drilling fluid.
2. The encapsulating agent used in the drilling fluid of the present invention, by optimizing monomer type and molecular weight, has both the drilling fluid encapsulating inhibition and low temperature rheological property, and avoids the problem of low temperature severe viscosity increasing of the drilling fluid caused by using the conventional macromolecule encapsulating inhibitor.
3. The drilling fluid of the present invention can maintain a stable rheological property in a typical deep water wellbore "low-temperature-high-temperature" large temperature difference range, which is beneficial to pressure control of the deep water drilling.

Other features and advantages of the present invention will be further detailed in the embodiments hereunder.

DETAILED DESCRIPTION OF THE EMBODIMENTS

Hereunder some embodiments of the present invention will be detailed. It should be appreciated that the embodiments described here are only provided to describe and explain the present invention, but shall not be deemed as constituting any limitation to the present invention.

The ends points and any value in the ranges disclosed in the present invention are not limited to the exact ranges or values. Instead, those ranges or values shall be comprehended as encompassing values that are close to those ranges or values. For numeric ranges, the end points of the ranges, the end points of the ranges and the discrete point values, and the discrete point values can be combined to obtain one or more new numeric ranges, which shall be deemed as having been disclosed specifically in this document.

The present invention provides an encapsulating agent, comprising an acrylamide monomer structure unit represented by formula (I), an anti-temperature monomer structure unit represented by formula (II), and a cation monomer structure unit represented by formula (III);

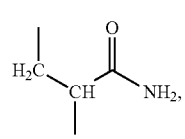

formula (I)

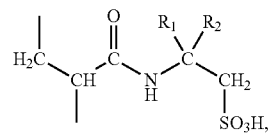

formula (II)

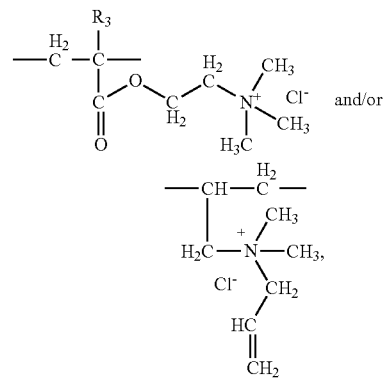

formula (III)

wherein $R_1$ and $R_2$ are each independently H, and linear or branched alkyl of C1-C15, and $R_3$ is H or linear or branched alkyl of C1-C5.

According to the encapsulating agent of the present invention, wherein preferably the mole ratio of the acrylamide monomer structure unit represented by formula (I), the anti-temperature monomer structure unit represented by formula (II), and the cation monomer structure unit represented by formula (III) is (2-20): (1-5): (1-10).

According to the encapsulating agent of the present invention, wherein preferably $R_1$ is methyl, decyl, undecyl or dodecyl.

According to the encapsulating agent of the present invention, wherein preferably $R_2$ is H or methyl.

According to the encapsulating agent of the present invention, wherein preferably $R_3$ is H or methyl.

According to the encapsulating agent of the present invention, wherein preferably the number-average molecular weight of the encapsulating agent is 200000-400000.

According to the encapsulating agent of the present invention, wherein preferably the cationic degree of the encapsulating agent is 1.1-1.25 mmol/g.

According to the encapsulating agent of the present invention, wherein preferably the encapsulating agent is a linear polymer composed of the acrylamide monomer structure unit represented by formula (I), the anti-temperature monomer structure unit represented by formula (II), and the cation monomer structure unit represented by formula (III).

The second aspect of the present invention provides a method for preparing an encapsulating agent, it should be appreciated that the above mentioned encapsulating agent by the method depicted herein. The method comprises: under a polymerization condition, performing a polymerization reaction on acrylamide, an anti-temperature monomer and a cation monomer, wherein the anti-temperature monomer is a compound having a structure as represented by the following formula (IV):

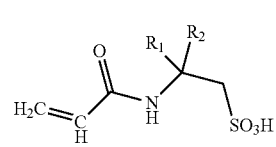

formula (IV)

and
the cation monomer is a compound having a structure as represented by the following formula (V):

formula (V)

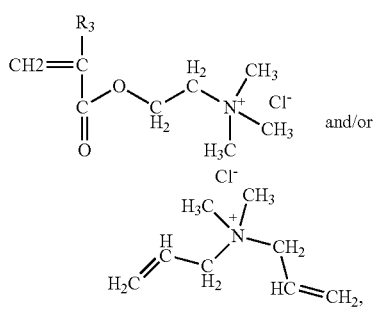

wherein $R_1$ and $R_2$ are each independently H, and linear or branched alkyl of C1-C15, and $R_3$ is H or the linear or branched alkyl of C1-C5.

According to the present invention, preferably $R_1$ is methyl, decyl, undecyl or dodecyl.

According to the present invention, preferably $R_2$ is H or methyl.

According to the present invention, preferably $R_3$ is H or methyl.

According to the present invention, preferably the anti-temperature monomer is 2-acrylamido-dodecyl sulfonic acid and/or 2-acrylamide-2-methyl propyl sulfonic acid.

According to the present invention, preferably the cation monomer is at least one of methacryloyloxyethyl trimethyl ammonium chloride represented by

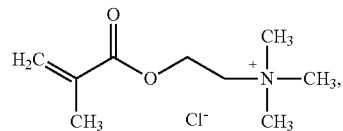

acryloyloxyethyl trimethyl ammonium chloride represented by

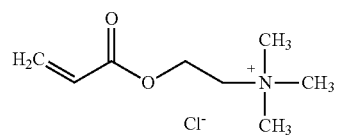

and dimethyl diallyl ammonium chloride represented by

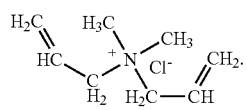

According to the present invention, preferably the polymerization condition comprises: in an inert atmosphere polymerization, the temperature of 50-100° C., preferably is 60-80° C.; time of 1-10 h, preferably is 2-3 h.

According to the present invention, preferably the total content of the monomers is 10-20 wt. %.

According to the present invention, the polymerization reaction should be performed at presence of an initiator, preferably based on a total weight of a polymerization solution, dosage of an initiator is 0.1-1 wt. %.

According to the present invention, the type of the initiator is a common option in the art, and for the present invention, a preferable initiator is sodium hydrogen sulfite and/or ammonium persulfate.

According to the present invention, the method further comprises using a terminator to terminate the polymerization reaction. The type of the terminator is a common option in the art, and for the present invention, a preferable terminator is mercaptoacetic acid.

According to the present invention, preferably, it further comprises purifying the polymerization product, wherein a purifying method has no special requirement, such as adding purificant into the reaction solution so as to precipitate the desired polymer. And for the present invention a preferable purificant is acetone.

In the present invention, the monomer concentration refers to the percentage content of a polymerization monomer to a polymerization solution.

In the present invention, the polymerization solution includes a polymerization monomer and a solvent.

In the present invention, the solvent used in the polymerization process is a common option in the art.

The present invention provides a use of the encapsulating agent of the present invention in the drilling fluid for petroleum drilling.

The present invention provides a drilling fluid for petroleum drilling comprising the encapsulating agent of the present invention.

According to a preferable embodiment of the present invention, the encapsulating agent of the present invention accounts for 60 wt. % or above of the total encapsulating agent in the drilling fluid, that is 60 wt. % or above of the total encapsulating agent in the drilling fluid is the encapsulating agent described above.

According to a preferable embodiment of the present invention, the drilling fluid comprises: water of 100 parts by weight, 2-3.5 parts by weight of an amine inhibitor, 0.1-0.5 parts by weight of a thickener, 0.15-0.5 parts by weight of an encapsulating agent, 0.8-5.5 parts by weight of a fluid loss reducer, 10-30 parts by weight of salt, 0-3 parts by weight of a fluid lubricant, 0-3 parts by weight of slurry mixing soil, and 0-20 parts by weight of a weighting agent.

The main modifications of the drilling fluid of the present invention lie in the encapsulating agent, the amine inhibitor, and the slurry mixing soil, and no special requirement is on other components, such as the fluid loss reducer, the salt, the fluid lubricant, the weighting agent, and the thickener, and they can be common options in the art.

According to a preferable embodiment of the present invention, wherein the amine inhibitor is polyamine and/or dimethyl cyclohexyl amine.

According to a preferable embodiment of the present invention, the polyamine is an amino polymer obtained by polymerization of polyether diamine with alkylene oxide, and more preferably, the mole ratio of polyether diamine and the alkylene oxide is 1-8:1-18.

According to the present invention, the condition for obtaining polyamine by polymerization includes: under a base condition, temperature of 60-120° C., time of 0.1-2 h.

According to a preferable embodiment of the present invention, the polyamine is prepared according to the following steps: adding 300 g of polyoxypropylene diamine and 0.3 g of potassium hydroxide in a high temperature and high pressure reaction kettle; vacuumizing and heating the reaction kettle, and starting stirring at the same time, wherein the stirring speed is 300 r/min; introducing 25 g of propylene oxide when the temperature is rised to 80° C., continuously rising the temperature, introducing 105 g of propylene oxide when the temperature is rised to 100° C.; maintaining a reaction temperature to be 105° C. after the reaction starts; and continuously maintaining the temperature for 30 min after the pressure in the reaction kettle drops and maintains the same, and then cooling to a room temperature.

According to a preferable embodiment of the present invention, the polyether diamine is one or more of polyoxyethylene diamine, polyoxypropylene diamine and polyoxyethylene propylene diamine.

According to a preferable embodiment of the present invention, the number-average molecular weight of the polyether diamine is 1000 or lower.

According to a preferable embodiment of the present invention, the alkylene oxide is selected from oxirane and/or propylene oxide.

According to a preferable embodiment of the present invention, the thickener is a xanthan gum and/or polyanionic cellulose; more preferably, the number-average molecular weight of the xanthan gum is 2,000,000-20,000,000.

According to a preferable embodiment of the present invention, the fluid loss reducer is at least one of a sulfomethal phenolaldehy resin, modified starch, polyanionic cellulose and carboxymethyl cellulose.

According to a preferable embodiment of the present invention, the salt is at least one of sodium chloride, potassium chloride, sodium formate and potassium formate.

According to a preferable embodiment of the present invention, the fluid lubricant is at least one of a polymeric alcohol lubricant and an oily lubricant.

According to a preferable embodiment of the present invention, the slurry mixing soil is sodium bentonite or a mixture of sodium bentonite and attapulgite; more preferably, in the mixture, the mass ratio of the sodium bentonite and the attapulgite is 1-10:1-5.

According to a preferable embodiment of the present invention, the weighting agent is barite and/or calcium carbonate, and an additive amount of the weighting agent can be determined according to density requirements of the drilling fluid.

By means of using a shale rolling and dispersing test, a Recommended International Standard (API Rec RP 13I) and drilling fluid low temperature theological property evaluation test, and a Recommended International Standard (API RP 13B-1), the shale inhibition property and theological properties between the encapsulating agent of the present invention and conventional macromolecule encapsulating agents HPAM and KPAM and domestic and overseas advanced encapsulating agents UCap-1 and UCap-2 are compared and evaluated, and please refer to Table 1 for results. The results in Table 1 show that under the condition of the same mass fraction, the shale recovery rate of the encapsulating agent of the present invention is far higher than that of the UCap-1, is similar to that of the UCap-2 and that of the KPAM, and is lower than that of the HPAM. The encapsulating agent of the present invention has a fewer influence on the low temperature theological property of the drilling fluid. At 4° C., the viscosity and shearing force of the bentonite pulp containing the encapsulating agent of the present invention is obviously lower than that of other encapsulating agents, which is beneficial to adjusting and controlling the low temperature theological property of the drilling fluid.

TABLE 1

Performance Comparison Among The Encapsulating Agent Of The Present Invention And Existing Typical Encapsulating Agents

| Treating agent | Shale recovery rate/% | Rheological parameter | |
| --- | --- | --- | --- |
| | | Plastic viscosity/ mPa · s | Yield point/Pa |
| 0.3 wt. % HPAM | 87.1 | 32 | 16 |
| 0.3 wt. % KPAM | 83.2 | 30 | 13.5 |
| 0.3 wt. % UCap-1 | 61.7 | 20 | 4.5 |
| 0.3 wt. % UCap-2 | 82.5 | 26 | 13 |
| 0.3% the encapsulating agent of the present invention (encapsulating agent obtained in example 1) | 81.9 | 14 | 4 |

Note: the test base slurry is sodium bentonite slurry with a mass fraction to be 4%; and in Table 1, 0.3 wt. % refers to the percentage content of the encapsulating to water.

Unless otherwise stated, all the experimental methods used in the following embodiments are conventional methods.

Unless otherwise stated, all materials and reagents used in the following embodiments are commercially available.

Polymeric alcohol, sulfomethal phenolaldehy resins SD-101 and SD-102, and a lubricant SD-505 in the following examples of the present invention are commercially available from Dongying Shida Innovation Science and Technology Co., Ltd.;

Dimethyl cyclohexyl amine is commercially available from Aladdin Company;

Xanthan gum XC is commercially available from Renqiu Yanxing Chemical Engineering Co., Ltd.;

Sulfonated brown coal resin, polyanionic cellulose PAC-HV, PAC-LV, carboxymethyl cellulose CMC-LV, modified starch FLOCAT, and sodium formate are commercially available from China Oilfield Services Limited;

Sodium bentonite is commercially available from Weifang Huaxia Bentonite Co., Ltd.;

Attapulgite is commercially available from Nanjing Nanjing Yadong Aotu Mining Co., Ltd.

Example 1

Preparing the free-clay phase deep water water-based drilling fluid comprises the constituents with the following weight ratio:

polyamine inhibitor: 2: xanthan gum XC: 0.3; the encapsulating agent: 0.25; polyanionic cellulose PAC-LV: 0.5; the sulfomethal phenolaldehy resin SD-101: 5; NaCl: 10; KCl: 4; and water is 100.

The polyamine inhibitor used in this example is prepared using the following method: Adding 300 g of polyoxypropylene diamine and 0.3 g of potassium hydroxide in a high temperature and high pressure reaction kettle; vacuumizing and heating the reaction kettle, and starting stirring at the same time, wherein the stirring speed is 300 r/min; introducing 25 g of propylene oxide when the temperature is rised to 80° C., continuously rising the temperature, and introducing 105 g of propylene oxide when the temperature is rised to 100° C.; maintaining a reaction temperature to be 105° C. after the reaction starts; and continuously maintaining the temperature for 30 min after the pressure in the reaction kettle drops and maintains the same, and then cooling to a room temperature to obtain a target product.

The encapsulating agent used in this example is prepared using the following method:

Under a stirring condition, adding acrylamide, methacryloyloxyethyl trimethyl ammonium chloride and 2-acrylamido-dodecyl sulfonic acid with a mole ratio of 5:1:2 into a four-mouth flask, wherein the solvent is deionized water; maintaining a total concentration of the monomer to be 15 wt. %; introducing nitrogen for deoxygenization; rising the temperature to 60° C.; after adding 0.1 wt. % of sodium hydrogen sulfite, continuously introducing nitrogen; maintaining the temperature to be constant; after reacting for 3 h, adding mercaptoacetic acid to terminate the reaction; then adding acetone into the result solution to obtain a target product (the number-average molecular weight is 200,000, and the cationic degree is 1.2 mmol/g).

Example 2

Preparing the clay phase deep water water-based drilling fluid system comprises the constituents with the following weight ratio:
the polyamine inhibitor: 3.5; xanthan gum XC: 0.15; the encapsulating agent: 0.25; carboxymethyl cellulose CMC-LV: 0.5; the sulfomethal phenolaldehy resin SD-102: 4; NaCl: 10; KCl: 5; polymeric alcohol: 1; slurry mixing soil (a mixture of sodium bentonite and attapulgite with a mass ratio to be 1:1): 3; and water is 100.

The method for preparing the polyamine inhibitor used in this example is the same as that in example 1.

The encapsulating agent used in this example is prepared using the following method:

Under a stirring condition, adding acrylamide, dimethyl diallyl ammonium chloride and 2-acrylamide-2-methyl propyl sulfonic acid with a mole ratio of 6:1:3 into a four-mouth flask, wherein the solvent is deionized water; maintaining a total concentration of the monomer to be 15 wt. %; introducing nitrogen for deoxygenization; rising the temperature to 65° C.; after adding 0.1 wt. % of a mixture of sodium hydrogen sulfite and ammonium persulfate, continuously introducing nitrogen; maintaining the temperature to be constant; after reacting for 2 h, adding mercaptoacetic acid to terminate the reaction; then adding acetone into the result solution to obtain a target product, wherein the number-average molecular weight is 400,000, and the cationic degree is 1.25 mmol/g.

Example 3

Preparing the clay phase deep water water-based drilling fluid system comprises the constituents with the following weight ratio:
dimethyl cyclohexyl amine: 2.5; xanthan gum XC: 0.1; the encapsulating agent: 0.5; carboxymethyl cellulose CMC-LV: 0.4; modified starch FLOCAT: 1; NaCl: 10; sodium formate: 10; KCl: 4; the lubricant SD-505: 1; sodium bentonite: 2; barite: 10; and water is 100.

The encapsulating agent used in this example is the same as that in example 2.

Example 4

Preparing the free-clay phase deep water water-based drilling fluid comprises the constituents with the following weight ratio:
polyamine inhibitor: 2.5; polyanionic cellulose PAC-HV: 0.5; the encapsulating agent: 0.15; carboxymethyl cellulose CMC-LV: 0.4; polyanionic cellulose PAC-LV: 0.4; NaCl: 15; potassium formate: 10; KCl: 5; the lubricant SD-505: 3; sodium bentonite: 2; barite: 20; and water is 100.

The method for preparing the polyamine inhibitor used in this example is the same as that in example 1.

The encapsulating agent used in this example is prepared using the following method:

Under a stirring condition, adding acrylamide, acryloyloxyethyl trimethyl ammonium chloride and 2-acrylamido-dodecyl sulfonic acid with a mole ratio of 5:2:2 into a four-mouth flask, wherein the solvent is deionized water; maintaining a total concentration of the monomer to be 13 wt. %; introducing nitrogen for deoxygenization; rising the temperature to 75° C.; after adding 0.1 w. % of sodium hydrogen sulfite, continuously introducing nitrogen; maintaining the temperature to be constant; after reacting for 3 h, adding mercaptoacetic acid to terminate the reaction; then adding acetone into the result solution to obtain a target product, wherein the number-average molecular weight is 300,000, and the cationic degree is 1.1 mmol/g.

The effects of the drilling fluids prepared in examples 1-4 are tested as follows:
1. Tests on Inhibition of a Hydration Dispersing Performance of the Deep-Water Water Sensitivity of Shale With reference to the Recommended International Standard (API Rec RP 13I) of the water-based drilling fluid inhibition test, through the shale rolling and dispersing test, the shale hydration dispersing inhibition capability of the drilling fluid is tested, and is compared with the performance of the oil-based drilling fluid. The sample shale used in the test comes from the deep water gas field of the westward of the South China Sea Comparative example 1 is mineral oil-based drilling fluid used in land oil field; and comparative example 2 is KCl/polymer water-based drilling fluid used in Bohai Oilfield of China.

It can be known from Table 2 that, the rolling recovery rate of the deep water shale stratum at the South China Sea is extremely low, which is merely 4.1%, and the water sensitivity is high. The shale recovery rates of the drilling fluid of examples 1-4 are all far higher than that of the conventional KCl/polymer water-based drilling fluid, and are close to or even higher than the oil-based drilling fluid in comparative example 1, which indicates that the drilling fluid of the present invention has excellent performance for inhibition of hydration of the shale.

TABLE 2

| | Inhibition Test Results Of Different Drilling Fluids | | | | | | |
|---|---|---|---|---|---|---|---|
| Testing sample | clear water | Comparative example 1 | Comparative example 2 | Eexample 3 | Example3 | Example 3 | Example 4 |
| Recovery Rate/% | 4.1 | 87.2 | 61.3 | 84.1 | 87.7 | 88.7 | 81.9 |

2. "Low Temperature-High Temperature" Large Temperature Difference Rheological Property The typical deep water wellbore temperature range is about 4° C. to 75° C. With reference to the Recommended International Standard (API RP 13B-1) for the water-based drilling fluid rheological property and filter loss performance test, the test determines the rheological properties of the drilling fluid of the present invention after being subjected to hot rolling at different temperatures. Comparative example 1 is the KCl/polymer water-based drilling fluid used in Bohai Oilfield of China, and comparative example 2 is high performance water-based drilling fluid used in a certain deep water well of the South China Sea. The results in Table 3 indicate that for the drilling fluid in comparative example 1, when the temperature is lowered from 75° C. to 4° C., severe thickening occurs in the drilling fluid, the plastic viscosity PV, the yield point YP, and the shearing force 10-min Gel that stands for 10 min can be increased by 2 times or above. For the drilling fluid in comparative example 2, when the temperature is lowered from 75° C. to 4° C., the plastic viscosity and the 10-min Gel can be increased by two times, and the yield point can be increased by one time or above. According to the definition of "flat rheological property" of the deep water drilling fluid in document SPE173059 made by the BP Company, a ratio of rheological parameters of the drilling fluid at 4° C. and at 50° C. is used to represent the rheological characteristic of the deep water drilling fluid within a large temperature difference range. PV(4° C.)/PV(50° C.) in comparative examples 1 and 2 are respectively 2.55 and 1.8; YP(4° C.)/YP(50° C.) are respectively 1.78 and 1.67; and 10-min Gel(4° C.)/10-min Gel(50° C.) are respectively 2.17 and 1.94. Moreover, the flat rheological characteristic of the deep water drilling fluid requires PV(4° C.)/PV(50° C.) of the drilling fluid <2.5; and 10-min Gel(4° C.)/10-min Gel(50° C.)<1.2. Therefore, for the rheological property of the common water-based drilling fluid, in the deep water wellbore temperature range, the rheological property would greatly change, so that the pressure at the bottom of the well would be hard to control, rendering a series of problems such as loss, well kick, difficulty in starting a pump, and large flow resistance of the drilling fluid, thereby severely putting off the smooth operation of drilling. For the drilling fluid in examples 1-4 of the present invention, PV(4° C.)/PV(50° C.) are respectively 1.53, 1.63, 1.74 and 1.74; YP(4° C.)/YP(50° C.) are respectively 1.22, 1.25, 1.28 and 1.45; and 10-min Gel(4° C.)/10-min Gel(50° C.) are respectively 1.11, 1.22, 1.18 and 1.4. The deep water water-based drilling fluid of the present invention has main rheological parameter values at 4° C. and 50° C. far smaller than that of the drilling fluid in comparative examples 1 and 2, in particular, in examples 1-3, it basically achieves index requirements of the "flat rheological" drilling fluid. Please refer to Table 3 for details. Therefore, the drilling fluid of the present invention has a stable rheological property within the "low temperature-high temperature" large temperature difference.

In addition, each of the drilling fluids in examples 1-3 of the present invention has an API filter loss<5 mL, and the drilling fluid in example 4 has an API filter loss to be 5.2 mL, which indicates the drilling fluid of the present invention has a good filter loss performance. Please refer to Table 3 for details.

TABLE 3 test results of rheological property and filter loss of the drilling fluid

| Drilling fluid | hot rolling temperature/° C. | wellbore temperature/° C. | plastic viscosity PV/mPa · s | yield point YP/Pa | 10-min Gel | filter loss/mL |
|---|---|---|---|---|---|---|
| Comparative example 1 | 120 | 4 | 51 | 22 | 19.5 | 3.6 |
| | | 50 | 20 | 12.5 | 9 | |
| | | 75 | 14 | 7 | 5 | |
| Comparative example 2 | 120 | 4 | 45 | 25 | 15.5 | 3.0 |
| | | 50 | 25 | 15 | 8 | |
| | | 75 | 15 | 11 | 4.5 | |
| Examplet 1 | 120 | 4 | 23 | 14 | 5 | 4.5 |
| | | 50 | 15 | 11.5 | 4.5 | |
| | | 75 | 12 | 9 | 3.5 | |
| Examplet 2 | 130 | 4 | 26 | 15 | 5.5 | 3.4 |
| | | 50 | 16 | 17 | 4.5 | |
| | | 75 | 12 | 9 | 4 | |
| Examplet 3 | 140 | 4 | 33 | 16 | 6.5 | 3.6 |
| | | 50 | 19 | 12.5 | 5.5 | |
| | | 75 | 15 | 9.5 | 4 | |
| Examplet 4 | 120 | 4 | 40 | 14.5 | 7 | 5.2 |
| | | 50 | 23 | 10 | 5 | |
| | | 75 | 16 | 7.5 | 3.5 | |

While some preferred embodiments of the present invention are described above, the present invention is not limited to the details in those embodiments. Those skilled in the art can make modifications and variations to the technical scheme of the present invention, without departing from the spirit of the present invention. However, all these modifications and variations shall be deemed as falling into the protected scope of the present invention.

In addition, it should be appreciated that the technical features described in the above embodiments can be combined in any appropriate manner, provided that there is no conflict among the technical features in the combination. To avoid unnecessary iteration, such possible combinations are not described here in the present invention.

Moreover, different embodiments of the present invention can be combined freely as required, as long as the combinations don't deviate from the ideal and spirit of the present invention. However, such combinations shall also be deemed as falling into the scope disclosed in the present invention.

The invention claimed is:

1. An encapsulating agent, comprising an acrylamide monomer structure unit represented by formula (I), an anti-temperature monomer structure unit represented by formula (II) and a cation monomer structure unit represented by formula (III);

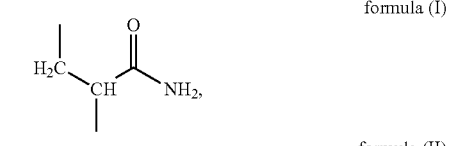

formula (I)

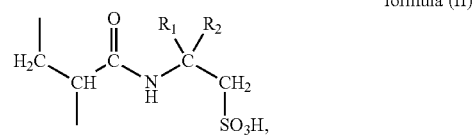

formula (II)

formula (III)

wherein a number-average molecular weight of the encapsulating agent is 200,000-400,000; and a cationic degree is 1.1-1.25 mmol/g;

wherein $R_1$ is decyl, undecyl or dodecyl, $R_2$ is H or methyl, and $R_3$ is H or the linear or branched C1-C5 alkyl.

2. The encapsulating agent according to claim 1, wherein a mole ratio of the acrylamide monomer structure unit represented by formula (I), the anti-temperature monomer structure unit represented by formula (II) and the cation monomer structure unit represented by formula (III) is (2-20): (1-5): (1-10);

and $R_3$ is H or methyl.

3. A method for preparing an encapsulating agent comprising: polymerizing a mixture of acrylamide, an anti-temperature monomer and a cation monomer to form the encapsulating agent, wherein the encapsulating agent has a number-average molecular weight of 200,000-400,000, wherein the anti-temperature monomer is a compound represented by formula (IV):

formula (IV)

the cation monomer is a compound represented by formula (V):

formula (V)

wherein $R_1$ is decyl, undecyl or dodecyl, $R_2$ is H or methyl, and $R_3$ is H or the linear or branched C1-C5 alkyl.

4. The method according to claim 3, wherein $R_3$ is H or methyl.

5. The method according to claim 4, wherein the anti-temperature monomer is 2-acrylamido-dodecyl sulfonic acid, the cation monomer is at least one of methacryloyloxyethyl trimethyl ammonium chloride represented by and acryloyloxyethyl trimethyl ammonium chloride represented by 6. The method according to claim 3, wherein the conditions for polymerizing comprise: an inert atmosphere, a temperature of 50-100° C., a time of 1-10 h.

7. The method according to claim 3, wherein the total content of the monomers is 10-20 wt. %.

8. The method according to claim 3, wherein based on a total weight of the mixture an initiator is present in an amount of 0.1-1 wt. %, and the initiator is selected from sodium hydrogen sulfite, ammonium persulfate, and combinations thereof.

9. The method according to claim 3, further comprising using a terminator to terminate the polymerizing and then adding a purificant into the mixture, wherein the terminator is mercaptoacetic acid; and the purificant is acetone.

10. The method according to claim 7, wherein the conditions for polymerizing comprise: a temperature of 60-80° C.; and a time of 2-3 h.

11. A drilling fluid for petroleum drilling comprising the encapsulating agent of claim 1.

12. The drilling fluid according to claim 11, wherein the encapsulating agent accounts for 60 wt. % or above of the total encapsulating agent in the drilling fluid.

13. The drilling fluid according to claim 11, wherein the drilling fluid comprises: 100 parts by weight of water, 2-3.5 parts by weight of an amine inhibitor, 0.1-0.5 parts by weight of a thickener, 0.15-0.5 parts by weight of an encapsulating agent, 0.8-5.5 parts by weight of a fluid loss reducer, 10-30 parts by weight of a salt, 0-3 parts by weight of a fluid lubricant, 0-3 parts by weight of a slurry mixing soil, and 0-20 parts by weight of a weighting agent.

14. The drilling fluid according to claim 13, wherein the amine inhibitor is polyamine and/or dimethyl cyclohexyl amine.

15. The drilling fluid according to claim 14, wherein the polyamine is an amino polymer obtained by polymerization of a polyether diamine with an alkylene oxide, and the mole ratio of the polyether diamine and the alkylene oxide is 1-8:1-18.

16. The drilling fluid according to claim 15, wherein the polyether damine is one or more of polyoxyethylene damine, polyoxypropylene diamine and polyoxyethylene propylene damine; and/or the number-average molecular weight of the polyether damine is 1000 or lower; and/or the alkylene oxide is oxirane and/or propylene oxide.

17. The drilling fluid according to claim 13, wherein the thickener is xanthan gum and/or polyanionic cellulose; and/or the fluid loss reducer is at least one of a sulfomethal phenolaldehy resin, modified starch, polyanionic cellulose and carboxymethyl cellulose; and/or the salt is at least one of sodium chloride, potassium chloride, sodium formate and potassium formate; and/or the fluid lubricant is at least one of a polymeric alcohol lubricant and an oily lubricant; and/or the slurry mixing soil is sodium bentonite or a mixture of the sodium bentonite and attapulgite; and/or the weighting agent is barite and/or calcium carbonate.

18. The drilling fluid according to claim 17, wherein the number-average molecular weight of the xanthan gum is 2,000,000-20,000,000, the slurry mixing soil is a mixture of the sodium bentonite and attapulgite, and in the mixture, a mass ratio of the sodium bentonite and the attapulgite is 1-10:1-5.

* * * * *